US009253716B2

(12) United States Patent
Ishizu et al.

(10) Patent No.: US 9,253,716 B2
(45) Date of Patent: Feb. 2, 2016

(54) WIRELESS COMMUNICATION SYSTEM AND METHOD OF WIRELESS COMMUNICATION

(75) Inventors: Kentaro Ishizu, Koganei (JP); Homare Murakami, Koganei (JP); Goh Miyamoto, Koganei (JP); Ha Nguyen Tran, Koganei (JP); Stanislav Filin, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 896 days.

(21) Appl. No.: 12/628,413

(22) Filed: Dec. 1, 2009

(65) Prior Publication Data

US 2010/0135214 A1 Jun. 3, 2010

(30) Foreign Application Priority Data

Dec. 2, 2008 (JP) ................................. 2008-307999

(51) Int. Cl.
*H04W 4/00* (2009.01)
*H04W 48/18* (2009.01)
(Continued)

(52) U.S. Cl.
CPC .............. *H04W 48/18* (2013.01); *H04W 28/18* (2013.01); *H04W 76/02* (2013.01)

(58) Field of Classification Search
USPC ........................................................ 370/328
See application file for complete search history.

(56) References Cited

U.S. PATENT DOCUMENTS

2007/0253394 A1* 11/2007 Horiguchi et al. ............ 370/338

FOREIGN PATENT DOCUMENTS

| JP | 2003-152732 A | 5/2003 |
| JP | 2007-184850 A | 7/2007 |
| JP | 2008-211583 A | 11/2008 |

OTHER PUBLICATIONS

IEEE P802.21/D8, Draft Standard for Local and Metropolitan Area Networks: Media Independent Handover Services, IEEE Computer Society, Dec. 2007.*

(Continued)

*Primary Examiner* — Gregory Sefcheck
*Assistant Examiner* — Majid Esmaeilian
(74) *Attorney, Agent, or Firm* — Abelman, Frayne & Schwab

(57) ABSTRACT

A technique that can effectively utilize unused wireless link and realize high-quality wireless communication between a communication terminal and a base station and enables efficient distribution of radio resources over an entire wireless communication system is provided. A wireless communication system in which a base station and a communication terminal can conduct wireless communication by detecting a usable wireless link and changing a wireless link used for the connection is also provided. On the communication network side, in addition to a plurality of wireless communication networks and a base station, a server device is provided. Connection-method reconstruction management means for determining a connection method of the wireless communication on the basis of communication condition information including information on usable wireless link at current locations of the base station and the communication terminal and connection-method reconstruction control means for controlling the connection method of the wireless communication for the corresponding base station are provided.

10 Claims, 12 Drawing Sheets

(51) Int. Cl.
  *H04W 28/18* (2009.01)
  *H04W 76/02* (2009.01)

(56) References Cited

OTHER PUBLICATIONS

G. Wu, P. Havinga and M. Mizuno, "Mirai Architecture for Heterogeneous Networks," IEEE Comm. Mag., pp. 126-134, 2002.
M. Inoue, K. Mahmud, H. Murakami, M. Hasegawa and H. Morikawa, "Novel Out—of—BandSignaling for Seamless Interworking between Heterogeneous Networks," IEEE Wireless Commun., vol. 11, No. 2, pp. 56-63, 2004.
H. Harada, "Software defined radio prototypetoward Cognitive Radio Communication Systems," IEEE Dyspan 2005, vol. 1, pp. 539-547, 2005.
Masahiro Kuroda, Yoshitoshi Murata, Hiroshi Harada, Shuzo Kato, "Cognitive Wireless Cloud (1) ~ Architecture," Technical Report of IEICE, Technical Committee on Software Radio, pp. 25-28, Mar. 2007.
IEEE P802.21 D8.0, http://www.ieee802.org/21/, IEEE Standard Draft, pp. 12-17 and pp. i-323, 2007.
Goh Miyamoto, Kentaro Ishizu, Mikio Hasegawa, Yoshitoshi Murata, "Cognitive Wireless Cloud (2) ~ Data Collection Method for Radio Resource Discovery in Cognitive Wireless Cloud~," Technical Report of IEICE, Technical Committee on Software Radio, pp. 29-34, Mar. 2007.
Yoshia Saito, Mikio Hasegawa, Yoshitoshi Murata, "Cognitive Wireless Cloud (3) ~Fast End-to-end QoS Measurement Method in Cognitive Wireless Cloud~," Technical Report of IEICE, Technical Committee on Software Radio, pp. 35-42, Mar. 2007.
H. N. Tran, M. Hasegawa, Y. Murata, "ResourceReservation Scheme for Mobile Users in Cognitive Wireless Cloud,"Technical Report of IEICE, Technical Committee on Software Radio, pp. 81-86, Mar. 2007.
H. Harada et al., "A Software Defined Cognitive Radio System," IEEE Globecom 2007, pp. 294-299, Nov. 2007.
H. Murakami et al., "Research on User-centric Distributed Resource Management for Cognitive Wireless Clouds—(6) Hierarchical Architecture for Cognitive Network Manager," IEICE Society Conference, p. 513, Sep. 2007.

* cited by examiner (A) ONLY ENAP (LAYER 2)

(B) ONLY ENAP (LAYER 3)

◯ IP SUB NET
● AGGREGATION POINT (C) BOTH INAP AND ENAP (LAYER 2, 3)

WIRELESS COMMUNICATION SYSTEM AND METHOD OF WIRELESS COMMUNICATION

CROSS-REFERENCE TO RELATED APPLICATIONS

This application is related to and claims priority under 35 USC §119(a) to Japanese Patent Application 2008-307999 filed on Dec. 2, 2008 which is incorporated by reference herein.

BACKGROUND OF THE INVENTION

1. Field of the Invention

The present invention relates to a wireless communication system capable of wireless communication between a base station and a communication terminal by detecting a usable wireless link and by changing the wireless link used for connection and a method of wireless communication, and particularly to a technique for effectively utilizing resources of the wireless link.

2. Description of the Related Art

Various types of wireless access systems such as mobile phone, wireless LAN, PHS and the like have spread, and a wireless MAN service such as WiMAX (Worldwide Interoperability for Microwave Access) is going to start.

In order to effectively utilize such access systems, research and development have been made on a technique to handover different types of wireless networks in a seamless manner (See, G. Wu, P. Havinga and M. Mizuno, "MIRAI Architecture for eterogeneous Networks," IEEE Comm Mag., pp. 126-134, 2002; and M. Inoue, K. Mahmud, H. Murakami, M. Hasegawa and H. Morikawa, "Novel Out-of-Band Signaling for Seamless Interworking between Heterogeneous Networks," IEEE Wireless Commun., Vol. 11, No. 2, pp. 56-63, 2004). Also, as disclosed in H. Harada, "Software Defined Radio Prototype toward Cognitive Radio Communication Systems," IEEE Dyspan 2005, Vol. 1, pp. 539-547, 2005, a software wireless technique capable of connection with different wireless interfaces in order to switch a different wireless system has been studied.

Based on these techniques, by switching to an optimal system according to a situation of a wireless network, more efficient use of limited radio resources (frequency, wireless infrastructure) and network resources will become possible. Also, as a result, total throughput and capacity are improved, leading to improvement efficient frequency usage.

In addition, for users, it becomes possible to communicate through an optimal wireless access all the time. For example, communication can be made through a mobile phone supporting high-speed movement during travel, while communication can be automatically switched to a wireless LAN through the inexpensive Internet when at home. A Cognitive Wireless Cloud advocated by the applicant of the present application is disclosed in Masahiro Kuroda, Yoshitoshi Murata, Hiroshi Harada, Shuzo Kato, "Cognitive Wireless Cloud (1)~Architecture~," IEICE Search Report, Technical Committee on Software Radio, March 2007. The Cognitive Wireless Cloud is cognitive wireless architecture in which a cognitive wireless terminal capable of connecting to various types of networks through a plurality of wireless access means autonomously collects information of the networks available at the site, obtains QoS information of each wireless accesses and networks on a real-time basis and optimizes capacity and an error rate of the entire network.

Considering an environment in which a large number of radio waves are present, the total capacity is improved if a complex system of the network as a whole including the terminal is in the optimal state. As a result, a bit rate per frequency is improved, and the frequency use efficiency is improved. The cognitive wireless network can be considered as a technique to form such an optimal state while switching various types of wireless systems.

The problem relates to how integration of the plurality of radio resources in such a cognitive wireless network is achieved. For example, a link aggregation technique that integrates communication bands of a plurality of wireless links in order to improve a throughput of communication has been known. However, with the prior-art link aggregation technique, dynamic selection in a plurality of frequencies according to the use situation over time is not possible, and an effect in the cognitive wireless network is limited.

As a technique relating to the present invention, a technique relating to collection of wireless information has been examined by the applicants of this application. For example, a technique for a terminal to autonomously recognize a usable network is disclosed by Goh Miyamoto, Kentaro Ishizu, Mikio Hasegawa, Yoshitoshi Murata, "Cognitive Wireless Cloud (2)~Data collecting method for discovering radio resources~," IEICE Search Report, Technical Committee on Software Radio, March 2007. A technique to obtain the respective network QoS information on a real-time basis is disclosed in Yoshia Saito, Mikio Hasegawa, Yoshitoshi Murata, "Cognitive Wireless Cloud (3)~High-speed end-to-end QoS measuring method~," IEICE Search Report, Technical Committee on Software Radio, March 2007. In addition, a technique to make efficient radio resource reservations for seamless handover that can deal with high-speed movement is disclosed in H. N. Tran, M. Hasegawa, Y. Murata, "Resource Reservation Scheme for Mobile Users in Cognitive Wireless Cloud," IEICE Search Report, Technical Committee on Software Radio, March 2007.

As a prior-art patent document relating to the present invention, an integrated wireless communication system is disclosed in Japanese Laid-Open No. 2008-211583. In this patent application, a plurality of wireless systems constituted by base stations accommodating terminal stations are connected to a network, respectively, and an information management server is installed therein. The server receives indication as to what type of wireless signals such as wireless communication standards, band widths, frequency channels, transmission power and the like are transmitted by each base station and at what location from each base station and creates a database. Then, in the information management server, a frequency to be used by each base station is determined and notified. A characteristic of this technique is that cognitive wireless that can optimize a frequency to be used is realized without direct wireless signal detection.

However, with the technique of Japanese Laid-Open No. 2008-211583, only the frequency that can be used from location information of the base stations is determined, and favorable communication cannot be necessarily realized by a communication terminal in an actuality. Also, communication quality required by the communication terminal is not necessarily ensured.

Japanese Laid-Open No. 2003-152732 discloses a software wireless communication device. This software wireless communication device converts a received radio wave by an analog-digital converter once and then performs demodulation or the like by a digital signal processor or a microprocessor in software. A plurality of frequencies or wireless methods can be dealt with by switching the software.

Japanese Laid-Open No. 2007-184850 discloses a cognitive communication system in which a database device maintaining information on a wireless channel use state is connected to each base station provided in the respective wireless access networks, and a database device having a database of frequencies used by the existing wireless access networks, integrating the database devices is installed on each of the base station sides. In order to manage wireless access devices with different communication methods or management methods in an integrated manner, common use of the functions and a communication interface between different devices are required. However, with the prior-art techniques, such functions are realized by a device developed specially for the wireless system, and the functions in the device are different and moreover, common use of the interface between the devices is not possible, which leads to a problem that general-purpose devices cannot be developed.

SUMMARY OF THE INVENTION

The present invention was made in view of the problems of the above prior-art techniques. It is an object of the present invention to provide a technique which enables high-quality wireless communication between a communication terminal and a base station effectively utilizing a wireless link not in use. The present invention realizes efficient distribution of radio resources in the entire wireless communication system.

A wireless communication system in which a base station and a communication terminal can conduct wireless communication by detecting a usable wireless link and changing the wireless link used for connection is provided. On the communication network side, together with a plurality of wireless communication networks having at least different communication methods and a single or a plurality of base stations corresponding to the wireless communication network, the system includes a base-station usable link detecting means for detecting a usable wireless link at a current location of the base station, a connection-method reconstruction management means for determining a connection method of the wireless communication on the basis of communication condition information including information on the usable wireless link at the current locations of the base station and the communication terminal, and a connection-method reconstruction control means for controlling the connection method of the wireless communication for the corresponding base stations according to the connection method determined by the means.

The communication terminal is provided with a terminal usable link detecting means for detecting a usable wireless link at a current location, a terminal reconstruction management means for notifying communication condition information on the terminal side including the information on the detected usable wireless link to the connection-method reconstruction management means and for receiving the connection method determined by the connection-method reconstruction management means, and a terminal reconstruction control means for controlling the connection method of the wireless communication at the communication terminal according to the connection method received by the terminal reconstruction management means.

The system may be configured such that the plurality of wireless communication networks are constituted by the wireless links with at least different frequencies, and the base-station usable link detecting means and the terminal usable link detecting means detect a usable frequency.

In the wireless communication system, the connection method may be configured as a link aggregation method in which a plurality of wireless links are integrated so as to establish a single traffic. In that case, a link aggregate management means for integrating and distributing the traffic with the communication terminal to the plurality of wireless links according to the connection method determined by the connection-method reconstruction management means so as to link-aggregate them is provided on the communication network side, while the communication terminal is provided with terminal link-aggregate management means for link-aggregating the traffic between the link-aggregate management means.

The system may be also configured including an authentication management means on the network side for performing authentication processing so as to conduct communication by each wireless link to be link-aggregated upon receipt of an instruction from the above-mentioned link-aggregate management means, while terminal authentication management means for performing the authentication processing so as to conduct the communication by each wireless link to be link-aggregated upon receipt of an instruction from the terminal ink-aggregate management means is provided on the communication terminal.

In the above-mentioned wireless communication system, it may be so configured that communication condition information includes communication quality information required by the communication terminal such as information on band, delay, jitter, loss ratio and the like.

The present invention can be provided as a wireless communication reconstruction management server for wireless communication between the base station and the communication terminal by detecting a usable wireless link and by changing the wireless link to be used in the connection. The server is provided with connection-method reconstruction management means for determining a connection method of wireless communication on the basis of the communication condition information including information on a usable wireless link at the respective current locations of the base station and the communication terminal and a connection-method reconstruction control means for controlling the connection method of the wireless communication for the corresponding base station according to the connection method determined by the connection-method reconstruction management means.

A wireless communication reconstruction management server having communication condition information that is information on usable frequencies can also be provided.

The system may be configured such that the above-mentioned connection method is a link-aggregation method in which a plurality of wireless links are integrated so as to establish a single traffic, and link-aggregate management means for integrating and distributing the traffic with the communication terminal to a plurality of wireless links according to the connection method determined by the connection-method reconstruction management means so as to link aggregate them is provided at the server.

Authentication management means for performing authentication processing for communication by each wireless link to be link-aggregated upon receipt of an instruction from the link-aggregate management means may be provided.

In the wireless communication reconstruction management server, a wireless communication reconstruction management server including information on communication quality required by the communication terminal in the communication condition information can be provided.

The present invention can also provide a wireless communication method as follows. A wireless communication method in which the base station and the communication terminal can conduct wireless communication by detecting a usable wireless link and by changing the wireless link to be used for connection, using a plurality of wireless communication networks with at least different communication methods and a single or a plurality of base stations corresponding to the wireless communication network, includes the following steps:

1. Step of usable link detection in which base-station usable link detecting means provided on the communication network side and terminal usable link detecting means of the communication terminal detect usable wireless links at the respective current locations;

2. Step of communication condition information notification in which terminal reconstruction management means of the communication terminal notifies the communication condition information on the terminal side including the information on the detected usable wireless link to connection-method reconstruction management means provided on the communication network side;

3. Step of connection-method determination in which the connection-method reconstruction management means determines a connection method of wireless communication on the basis of the communication condition information including the information of usable wireless links at the current locations of the base station and the communication terminal and transmits it to the communication terminal;

4. Step of connection method reception in which the terminal reconstruction management means of the communication terminal receives the connection method determined by the connection-method reconstruction management means; and 5. Step of connection-method reconstruction control in which connection-method reconstruction control means provided on the communication network side controls a connection method of the wireless communication for the corresponding base station according to the determined connection method, step of terminal reconstruction control in which terminal reconstruction control means of the communication terminal controls the connection method of the wireless communication at the communication terminal according to the determined connection method.

In the above-mentioned wireless communication method, it may be so configured that a plurality of wireless communication networks are constituted by wireless links with at least different frequencies and the base-station usable link detecting means detects a usable frequency.

In the above-mentioned wireless communication method, the connection method may be a link-aggregation method in which a plurality of wireless links are integrated so as to establish a single traffic. When the traffic is generated between the base station and the communication terminal, a link-aggregate step may be provided in a configuration such that the link-aggregate management means provided on the communication network side integrates and distributes the traffic with the communication terminal according to the determined connection method to a plurality of wireless links for link-aggregation, and terminal link-aggregate management means of the communication terminal link-aggregates the traffic between the link-aggregate management means.

BRIEF DESCRIPTION OF DRAWINGS

The invention will be described in further detail below and with reference to the attached drawings in which the same or similar elements are referred to by the same number, and where.

DETAILED DESCRIPTION OF THE INVENTION

Embodiments of the present invention will be described below based on examples shown in the figures. The embodiments are not limited to the following.

The present invention is a wireless communication system in which a wireless link between a base station/communication terminal can be selected for the base station connected to an external network such as the Internet and the communication terminal to perform wireless communication with the base station through the wireless communication network.

First, architecture of a wireless network according to the present invention is called cognitive wireless cloud. The cognitive wireless cloud is described in detail in H. Harada et al., "A software Defined Cognitive Radio System," IEEE Globecom 2007, November 2007, which is incorporated by reference herein. The outline of the cognitive wireless cloud will be described in conjunction with the description of the present invention.

The cognitive wireless cloud is wireless network architecture in which setting and switching of a plurality of wireless systems with different characteristics are performed autonomously and in a distributed manner at a terminal according to a user policy. As a result, scalable control and optimization of a network are carried out, usable wireless accesses are used at the maximum, and use efficiency of the frequency is improved.

Figure 1:
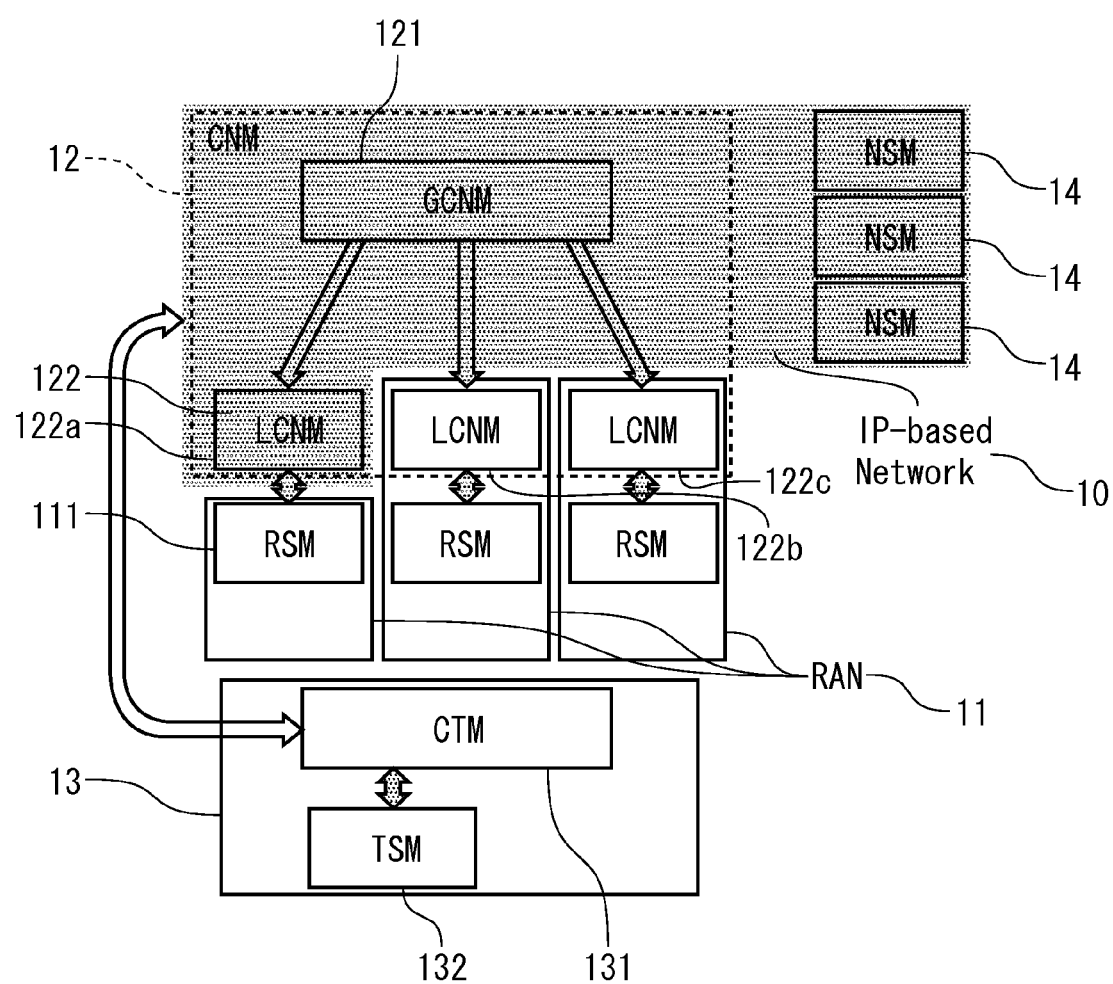
FIG. 1 is an explanatory diagram illustrating a network structure of a cognitive wireless cloud according to the present invention.

FIG. 1 shows architecture of CWC. On the network side, a plurality of wireless access networks (RAN: Radio Access Network) (11) are connected to an IP network (10). The RAN (11) is a unit of a network relating to a single wireless technique including an access point and a base station.

A connection interface to the IP network (10) needs to be an IP, but inside the RAN (11), it does not have to be an IP. The IP network (10) has a cognitive network manager (CNM: Cognitive Network Manager) (12), and this can be functionally broken down to a global GCNM (121) and a local LCNM (122) (See H. Murakami et al., "Research on User-centric Distributed Resource Management for Cognitive Wireless Clouds—(6) Hierarchical Architecture for Cognitive Network Manager," IEICE Society Conference, September 2007, which is incorporated by reference herein.)

The GCNM (121) is present in the IP network (10), but LCNM (122) can have two configurations, that is, a case of presence in the IP network (10) and a case of presence inside the RAN (configurations of 122b/122c).

On the other hand, in a terminal (13), a cognitive terminal manager (CTM: Cognitive Terminal Manager) (131) is present, and communication between the network and the terminal is all performed between the CNM (12) and the CTM (131).

A network Statistics Monitor (NSM: Network Statistics Monitor) (14), a RAN Statistics Monitor (RSM: RAN Statistics Monitor) (111), and a Terminal Statistics Monitor (TSM: Terminal Statistics Monitor) (132) measure information relating to quality of the network at the network, RAN, terminal, respectively or perform calculation as statistic information and processing to useful information and the like.

By means of the architecture as above, the following scenario is intended to be realized. First, it is so configured that if other many terminals are connected to an access point and the point becomes crowded, the terminal recognizes the crowdedness and can move to another access point so as to continue the communication. Also, if an application requiring a wide band such as video is used, connection to access points in plural is aggregated so as to ensure the band. Even if the terminal moves, the access point for aggregation is changed as appropriate so as to enable continuation of the communication.

If a large number of terminals are present in an area and an access point of the area is crowded, a network administrator can recognize the crowdedness and can ease the crowdedness by expanding and improving the radio resources. At this time, it is configured so that a network can be automatically reconstructed even by connecting an access point without special function sold in the market to the network. Moreover, if nonconformity occurs at an access point, the network administrator can recognize the nonconformity.

The present invention is one of techniques contributing to realization of such a cognitive wireless cloud and exerts effects such that a band required, particularly by a terminal, is effectively ensured. A band is ensured by aggregating connection to a plurality of access points. The radio resources can be expanded and improved for use and the like. A configuration of the present invention will be described below in detail.

Figure 2:
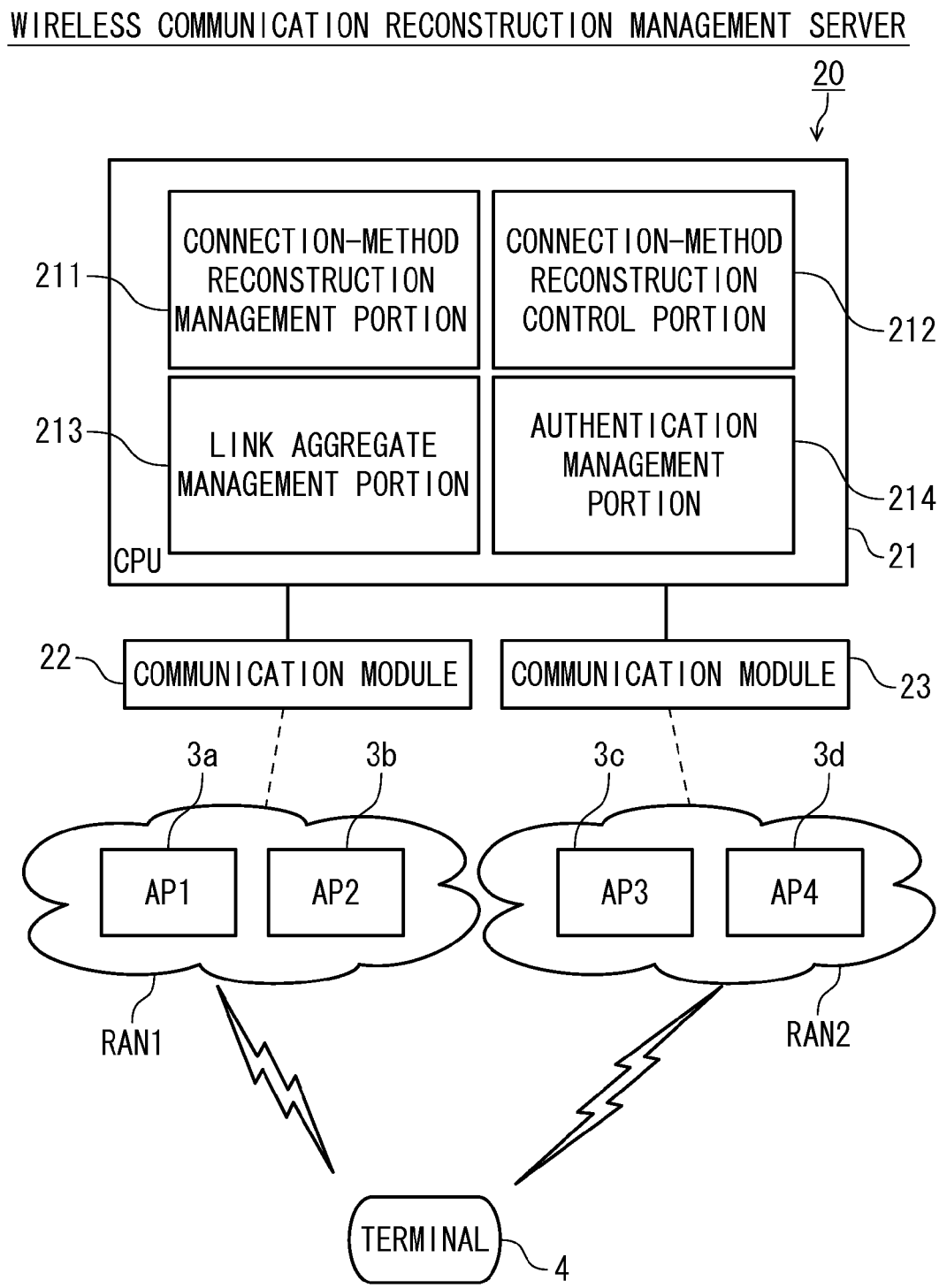
FIG. 2 is a configuration diagram of a wireless communication reconstruction management server in the present invention.

FIG. 2 is a configuration diagram of a wireless communication reconstruction management server (20) according to the present invention. The present invention does not necessarily have to be constituted by a single server device, but connection-method reconstruction management means, connection-method reconstruction control means, link-aggregate management means, and authentication management means, which will be described later, may be arranged in a distributed manner in arbitrary server devices installed on a network. At that time, it is only necessary to provide a communication path between each means.

In this embodiment, a wireless communication reconstruction management server (20) is provided particularly as the GCNM (121) of the CNM (12) shown in FIG. 1. Accordingly, the CNM (12) is formed not only by a plurality of wireless communication networks such as a WiFi standard base station, but also by the LCNM (122) provided at a base station for a mobile phone.

The wireless communication reconstruction management server (hereinafter referred to as this server) (20) can be easily realized by a known personal computer, a server computer and the like, and is provided with a CPU (21) for executing processing in collaboration with a memory, not shown, an external network such as the Internet, and communication modules (22) and (23) for direct communication with a base station. In addition, input means such as a keyboard or the like and external memory means such as a hard disk or the like may be provided as is known.

The communication modules (22) and (23) can be constituted by a network card connected to the Internet or the like, a network card connected to a base station in a wired or wireless manner and the like. The IP (Internet Protocol) used in the Internet is generally used as the communication protocol, but selection is arbitrary. A configuration in which this server (20) is connected to each of all the base stations through the Internet is the simplest, and in this case, the number of communication modules can be one to be connected to the Internet.

In the present invention, this server (20) can use various wireless communication networks (RAN1) (RAN2) as shown in FIG. 2, and a technique to select a plurality of base stations (3a) to (3d) in each of the wireless communication networks (RAN1) (RAN2) is also provided. Also, in addition to the selection of one base station, link aggregation with the communication terminal (4) by selecting a plurality of base stations and integrating the wireless links (LK1) (LK2) is also realized. A configuration for that purpose will be described below in detail.

First, the CPU (21) of the server (20) is provided with a connection-method reconstruction management portion (211) as the connection-method reconstruction management means, connection-method reconstruction control portion (212) as the connection-method reconstruction control means, a link aggregate management portion (213) as the link aggregate management means on the communication network side, and an authentication management portion (214) as authentication management means on the communication network side.

Figure 3:
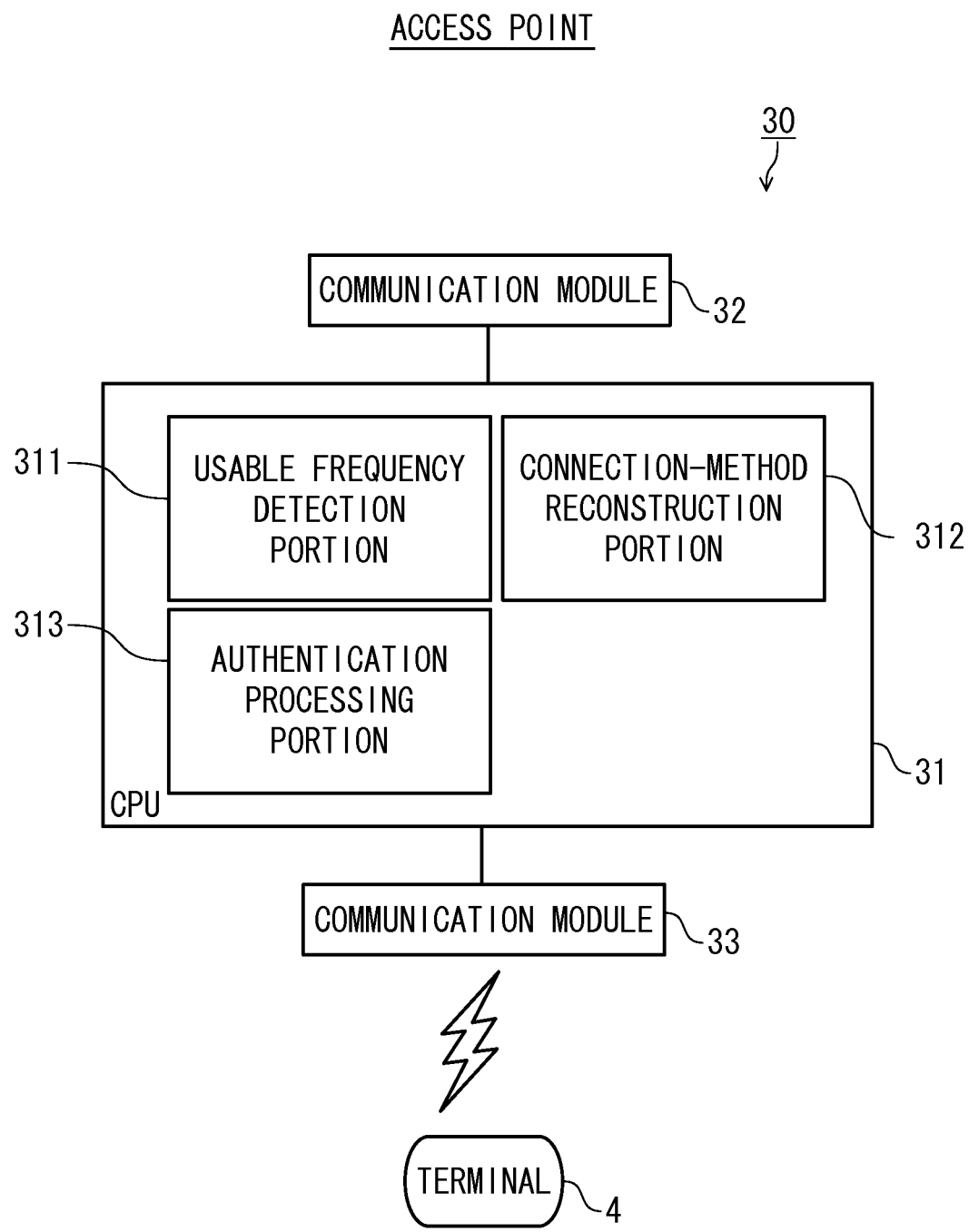
FIG. 3 is a configuration diagram of an access point in the present invention.

A configuration of an access point (30) as each of corresponding base stations is shown in FIG. 3. As the access point (30), in addition to those sold in the market as a wireless LAN router or the like or a known configuration such as a mobile phone base station installed by a mobile phone operator in a mobile phone network, for example, in the present invention, as shown in the figure, the CPU (31) is provided with a usable frequency detection portion (311) as base-station usable link detecting means on the communication network side, a connection-method reconstruction portion (312) operated by a command from the connation-method reconstruction control means, and an authentication processing portion (313) operated by a command from the authentication management means. Also, together with a communication module (32) for connection to the communication modules (22) and (23) of this server (20), a communication module (33) for connection with the communication terminal (4) is also provided.

It is also possible to deal with a plurality of wireless communication networks with a single base station. In that case, a plurality of the communication modules (33) may be provided. The communication module (33) may be a module that can deal with a plurality of communication networks different at least either physically or logically.

Design of each constituent element is different in accordance with the wireless access network, but each base station is constituted by such access point (30). And the access point is connected to the communication terminal (4) with the respective communication method. The communication method in the present invention is not limited to communication methods on a physical layer (first layer) such as a wireless frequency, a band width to be used and the like. Those with different communication methods on any level such as a data link layer (second layer) relating to an error correcting method, a network layer (third layer) relating to a path selection method such as IP, a transport layer (fourth layer) relating to a communication protocol such as TCP and UDP and the like can be also regarded as different wireless links. Moreover, a control method in a higher session layer (fifth layer), a data conversion method in a presentation layer (sixth layer), a transmission method in an application layer (seventh layer) and the like can be also considered as communication methods.

Figure 4:
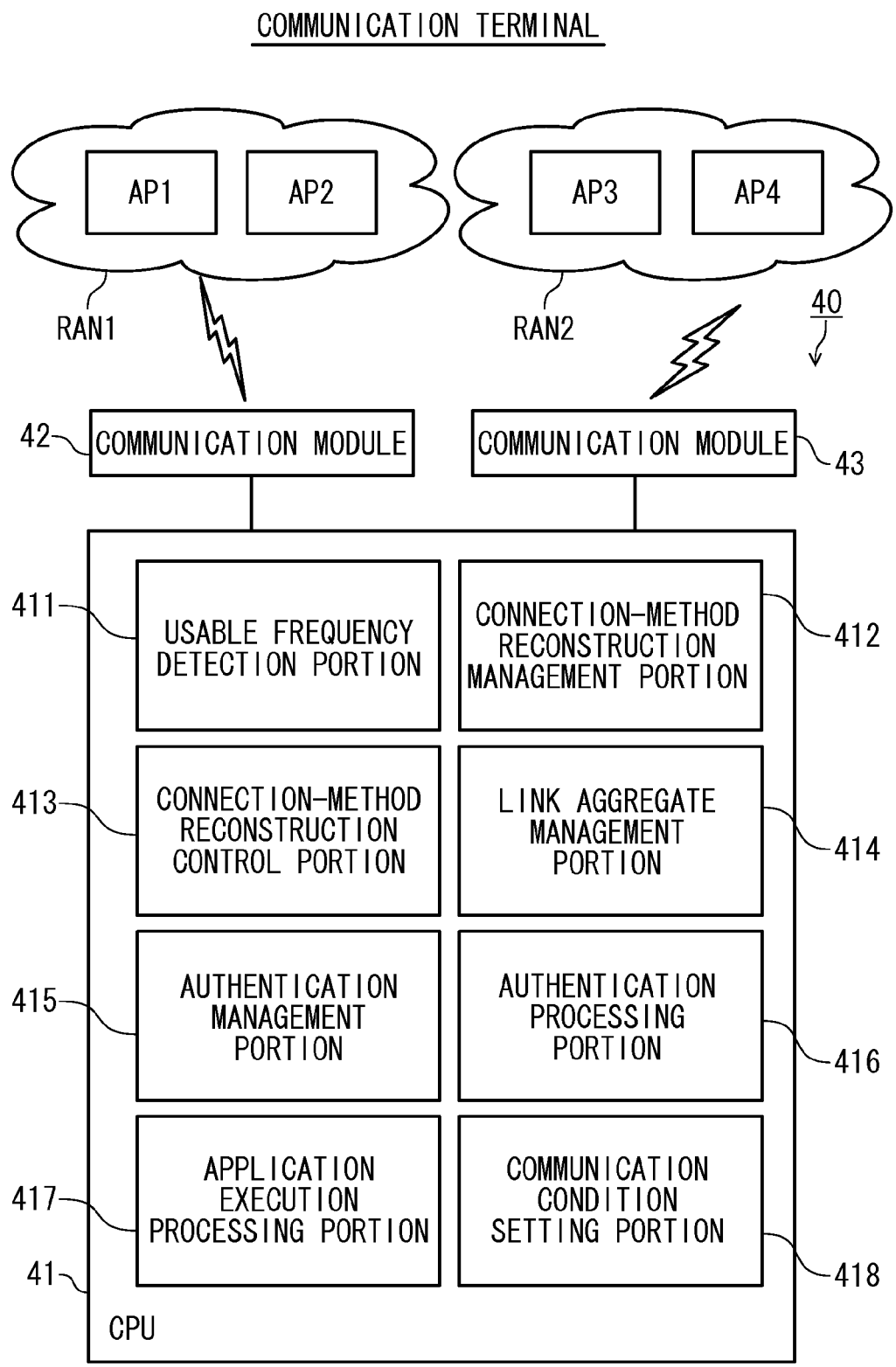
FIG. 4 is a configuration diagram of a communication terminal device in the present invention.

An example of the communication terminal (4) is shown in a communication terminal device (hereinafter referred to as this terminal) (40) in FIG. 4. This terminal (40) can be constituted by a mobile information terminal such as a mobile phone terminal, PDA and the like in addition to personal computers. Known input means, display means, external memory means and the like are provided together with the CPU (41), and communication modules (42) and (43) are also provide in accordance with the plurality of wireless communication networks (RAN1) (RAN2).

A plurality of communication modules may be provided as in the figure or they may be those that can deal with a plurality of communication networks different at least either physically or logically. A prior-art software modem technique can be also used.

The CPU (41) is provided with a usable frequency detection portion (411) as terminal usable link detecting means, a connection-method reconstruction management portion (412) as the terminal reconstruction management means, a connection-method reconstruction control portion (413) as the terminal reconstruction control means, a link-aggregate management portion (414) as the terminal link aggregate management means, an authentication management portion (415) as the terminal authentication management means, and an authentication processing portion (416) operated by a command of the terminal authentication management means.

Other than above, an application execution processing portion (417) executing various application programs for performing a web browser, a mail client, a voice call, video reception and the like on this terminal (40) as known is provided. Also, the present invention is provided with a communication condition setting portion (418) determining a communication condition such as a communication quality required by a program executed by the application execution processing portion (417).

Figure 5:
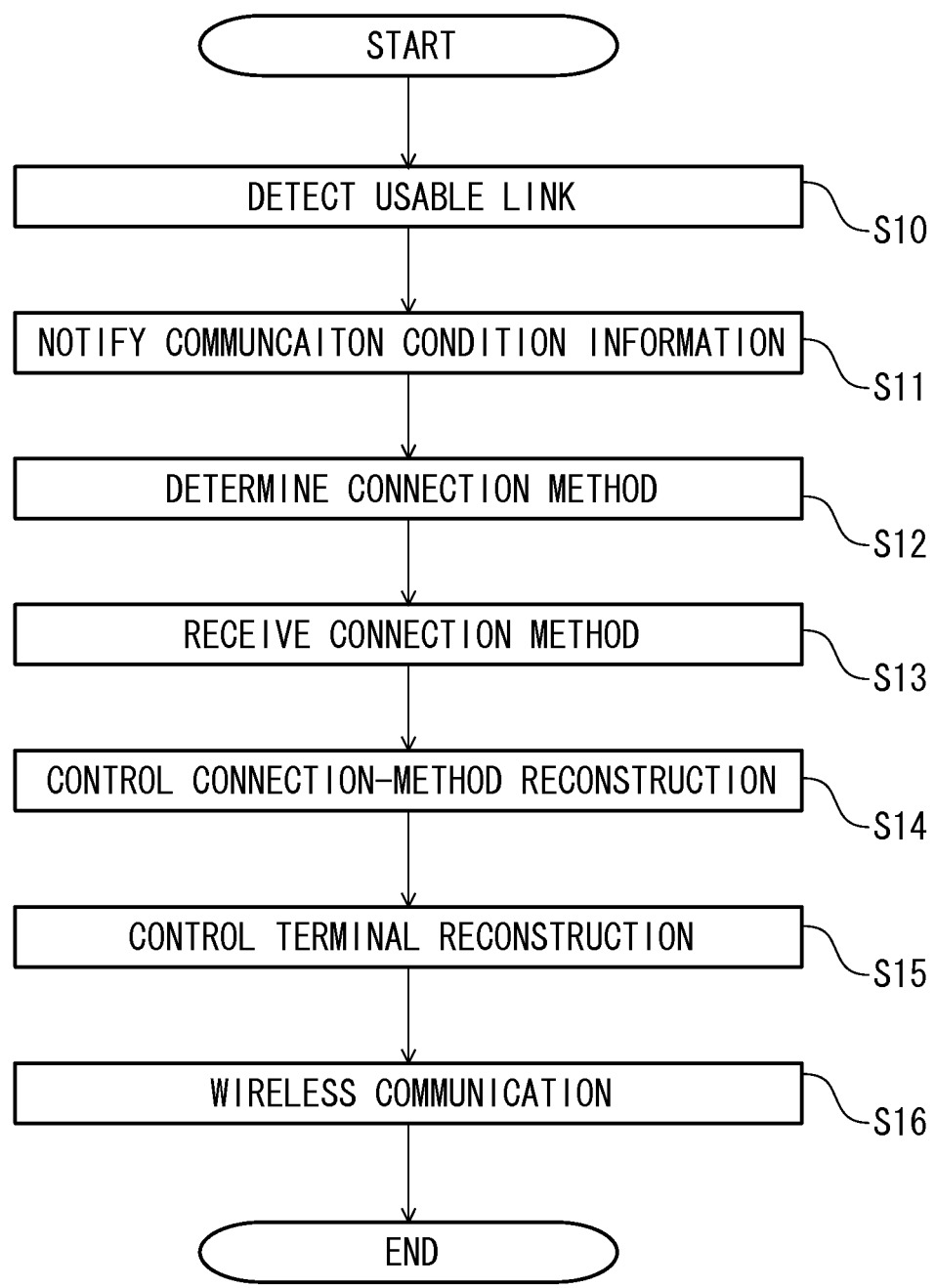
FIG. 5 is a processing flowchart of the present invention.
Figure 6:
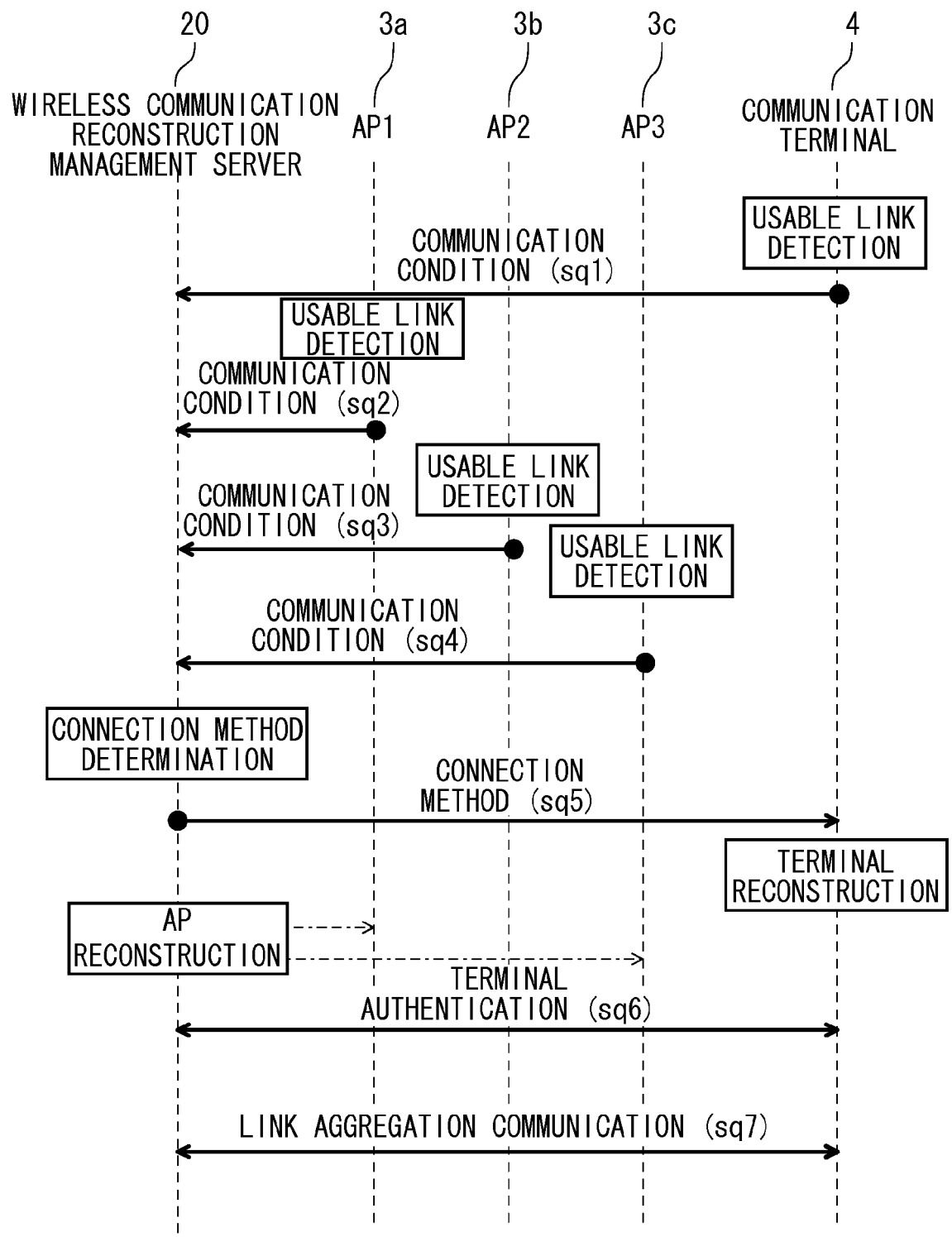
FIG. 6 is a sequence diagram in processing of the present invention.

Configurations of the devices (20), (30), and (40) in the best mode for carrying out the present invention are as above. A wireless communication method shown in FIGS. 5 and 6 is executed among them. First, a usable link detection step (S10) will be described. In this terminal (40), the usable frequency detection portion (411) measures unused frequencies around the terminal. That is, the frequencies are scanned using the communication modules provided in this terminal (40) as the communication modules (42) and (43) so as to detect a frequency not in use for communication. Any known techniques can be used for the scanning method.

For example, in the case of the communication module in the wireless LAN, wireless LAN base stations are searched so as to examine a channel for which radio wave is detected around it. If channel 1 is used at this time, channels 2 to 13 are unused frequencies. Actually, in the case of proximate channels, they mutually affect communication quality, and it can be so detected that channels 4 to 13 are unused frequencies.

Even if a frequency in use is different depending on an area as the frequency bands of TV or radio, an unused frequency at the location can be detected by the usable frequency detection portion (411).

Figure 7:
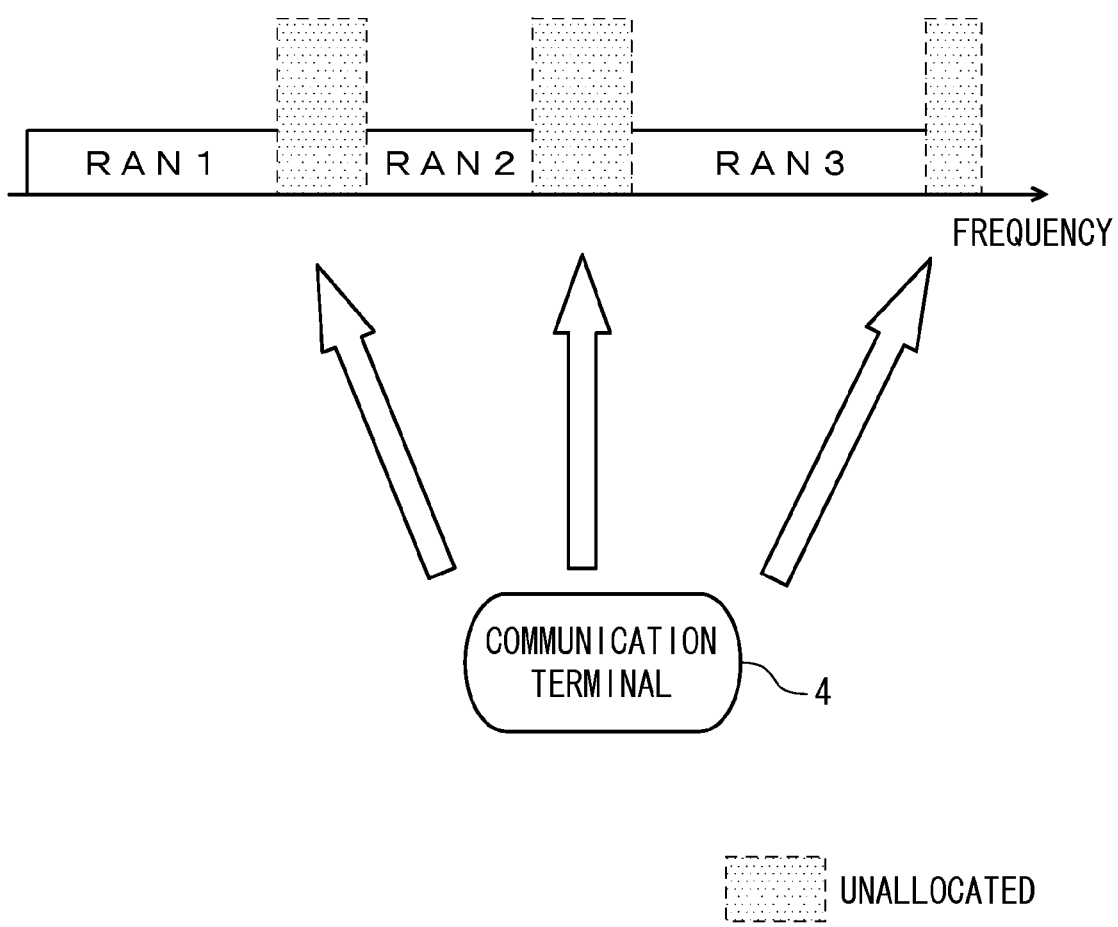
FIG. 7 is an explanatory diagram illustrating a situation of an unused frequency.

Moreover, unused frequency bands with a predetermined band width are present in plural frequencies among the wireless communication networks (RAN1 to RAN3) to which the frequencies have been already allocated as shown in FIG. 7. The usable frequency detection portion (411) can also detect such an unused frequency band using the communication module.

The present invention is characterized by detection of an unused frequency around this terminal (40). Since the prior-art techniques are developed supposing a wireless system provided by a specific operator such as a mobile phone network, it was considered that collection of information only for the base stations was enough. Thus, they are not configured such that unused resources are collected by the communication terminals. However, in the cognitive wireless network, in order to effectively utilize a frequency band used by a mixture of various operators and individuals, detection of a wave interference situation around the terminal or the like, which can never be detected only by the base station, is particularly effective.

The usable frequency detection portion (311) of the access point (30) also detects unused frequencies around the access point. It is only necessary that both this terminal (40) and the access point (30) search usable frequencies only for the frequency capable of wireless communication with the devices.

A communication condition information notification step (S11) will be described. Information on usable frequencies is transmitted to this server (20) as the communication condition information. FIG. 6 is a sequence diagram for explaining a flow of data at this time, and the communication condition information is transmitted from the communication terminal (4)/access points (AP1), (AP2), and (AP3), respectively. (sq1) to (sq4)

A path used for the communication may be an external network such as the Internet or a signaling channel may be used for communication exclusively of management information. Such channels do not have to be a high-speed line since an information quantity is small, and a communication path having high stability in a wide area is preferable.

Here, for the communication conditions of the present invention, various types of information in addition to the unused frequency can be used. First, any wireless link with any different parameter may be used not limited to a link with a different frequency, as long as it is a link that can establish communication without obstructing an existing wireless link. For example, if a modulation method of a wireless signal is different and both can be present at the same time, the usable modulation method can be used as information of the usable link and in that case, the frequency bands may be overlapped.

A wireless link may be one with a different MAC (media access control) method. That is, a wireless link with different frame transmission/reception method, frame format, error detection method and the like may be used.

The communication quality required by this terminal (40) may be included in the communication condition. The information that can be included in the communication condition includes the following. On the basis of the type of an application executed by the application execution processing portion (417), a band required by the communication condition setting portion (418), delay, jitter, loss rate and the like can be set. As is well known, required scale of communication quality is different depending on the type of the application such as those requiring a high throughput, those requiring a low error rate and the like.

Thus, the type of an application is detected by the communication condition setting portion (418) as follows. The simplest way is to obtain a name of the application from a file name or the like when reading the application program. An application type database is provided in the external memory device, and the type of the application is specified by referring to the database. Table 1 is an example of the application type database.

TABLE 1

| Execution file path | Application name | Type |
| --- | --- | --- |
| c:\abc.exe | ABC | Voice call |
| d:\def.exe | DEF | File transfer |

Referring to this database, if a file of c:\abc.exe is executed, for example, it can be easily detected that the application of "voice call" is being executed.

In the present invention, in addition to the above, a packet passing through the communication modules (42) and (43) are monitored so that the type and name of the application can be specified from a mode of the packets. Particularly, a method of classifying them into voice call, video streaming, file transfer, and other applications and specifying the type will be described. Such classification is made because, according to the findings by the inventors, with these applications, a high throughput does not simply lead to a high communication quality on the applications, and selection needs to be made considering loss and jitter of the packets at each base station.

First, with regard to the voice call, among UDP (User Datagram Protocol) packets received by this terminal (40), if a series of packets having an average throughput less than 32 kbps and continuing for two seconds or more with the same destination address are detected, it is detected that the application for voice call is being executed and processed.

As for the video streaming, among the UDP packets received by this terminal (40), if a series of packets having an average throughput of 32 kbps or more and continuing for two seconds or more with the same destination address are detected, it is detected that the application for video streaming is being executed and processed.

As for the file transfer for downloading or uploading with a server, if a series of TCP (Transmission Control Protocol) packets transmitted or received by this terminal (40) with a destination port number of any of 80, 21 or 20, having an average throughput of 32 kbps or more and continuing for 5 seconds or more with the same destination address are detected, it is detected that the application for file transfer is being executed and processed.

If any of the above is not applicable, it is classified as one of other applications. The modes of these packets are stored in the external memory device as a packet mode database. An example of the packet mode database is shown in Table 2.

TABLE 2

| Protocol | Average throughput | Duration | Destination port number | Type |
| --- | --- | --- | --- | --- |
| UDP | Less than 32 kbps | 2 seconds or more | Indefinite | Voice call |
| UDP | 32 kbps or more | 2 seconds or more | Indefinite | Video |

TABLE 2-continued

| Protocol | Average throughput | Duration | Destination port number | Type |
| --- | --- | --- | --- | --- |
| TCP | 32 kbps or more | 5 seconds or more | 80/20/21 | File transfer |
| Indefinite | Indefinite | Indefinite | Indefinite | Others |

After the type of the application is detected by any of the above methods and the like, required communication conditions are set according to the type. In this case, too, it is only necessary that values of the communication quality are defined according to the database as in Table 3 for each type.

TABLE 3

| Type | Communication band | Delay | Jitter | Loss rate |
| --- | --- | --- | --- | --- |
| Voice call | 300 kbps or more | 10 ms or less | 1 ms or less | 1% or less |
| Video | 500 kbps or ore | 10 ms or less | 1 ms or less | 1% or less |
| File transfer | 50 kbps or more | 10 ms or less | 1 ms or less | 1% or less |
| Others | Indefinite | 50 ms or less | 1 ms or less | 1% or less |

The present invention is not limited to the communication quality required by the usable wireless link or application as above, various communication conditions can be used. Here, considering the general communication conditions, five viewpoints, that is, (1) radio information, (2) communication quality, (3) stability, (4) cost, and (5) power consumption of the terminal are considered important.

(1) Radio information (RF): In order for a terminal to use a radio resource, first, the terminal should be within a cover area of the radio resource. Which radio resource is available when a terminal is located at a certain position can be obtained by two methods, that is, a method of searching by the terminal itself through scanning and a method of obtaining information from the network, and the two methods can be used at the same time as appropriate in this system.

With the latter method, it is only necessary that the CNM (12) covering the plurality of RAN (11) has information on a cover area of each RAN, and it is stored in a hard disk, memory and the like. This method has a wide target frequency range and is considered to be more effective, if the prediction on which radio resource can be used is more difficult.

(2) Communication quality (End-to-end QoS): As having been already described, since the required communication quality is different depending on the application in use, not only the binary information such as whether or not the connection is possible as described in (1) but finer QoS information is required. The QoS information includes delay, jitter, loss rate, and a usable band.

Particularly, if a new terminal breaks into a crowded radio resource, that badly affects the communication quality of the other terminals having already used the radio resource, and it is considered to be important that what degree of a band the new terminal can use can be estimated in advance with accuracy. This usable band information is information required in order to achieve the object of this system that improves frequency use efficiency by promoting load distribution of the entire network.

(3) Stability: In the wireless communication in which the communication quality is dynamically fluctuated, not only the instantaneous QoS information described in (2) but also its stability becomes an important parameter. For example, there can be a case in which a radio resource with a narrow band but stable might be preferable than a radio resource in which a wide band can be temporarily used.

As a specific example, if switching of the radio resources is repeated with movement of a user so as to continue communication, there can be a demand that the number of switching times should be reduced as much as possible. For that purpose, it is effective to estimate time during which the radio resource can be continuously used.

(4) Cost: There can be a case in which a lower communication fee is given priority over QoS guarantee depending on a user or an application. From the viewpoint of satisfaction of the user, the communication fee is also an important parameter in radio resource selection.

(5) Power consumption of the terminal: During use of wireless communication, if a battery of the terminal runs out, further communication is impossible, and how much power consumption is required in the communication can be an important element in selection of the radio resource.

Considering the above communication conditions, an access point to perform wireless communication with this terminal (4) in this server (20) and a communication method are selected. Thus, a connection-method determination step (S12) will be described.

The simplest configuration of the connection-method reconstruction management portion (211) of this server (20) is to store a list of communication qualities between each base station and the communication terminal as a database. Then, if the above communication conditions are received from this terminal (4), the communication method is selected so that an unused frequency in either of the access point and the communication terminal is used and the communication is conducted with the base station in which a required communication quality can be ensured.

However, for this method, a communication state between each communication terminal and the base station needs to be measured and recorded in advance. Also, since the communication quality is different depending on the location of the communication terminal, a favorable communication method cannot be necessarily selected. Then, a configuration in which the connection rule is stored in the external memory device of this server (20) and a connection-rule creation portion, not shown, is provided in the CPU (20) will be described.

In order to stipulate as a connection rule, what communication parameters should be used will be described. The following information can be obtained in accordance with the required conditions of the above (1) to (5):

(1) Radio information.

(1-1) Type of radio. First, information on the type of radio is indispensable. If the communication terminal (40) does not have capability to modulate/demodulate the type of the radio, communication cannot be made. This can be easily obtained by an action of the communication module (42).

(1-2) RSSI (Received Signal Strength Indicator). This is information for estimating communication qualities. Other parameters such as BER (Bit Error Rate) or the like might be used depending on the type of the radio. They can also be obtained on the basis of the information from the communication module (42) using a known technique. Obtaining of the wireless information is a function of the TSM (132) in FIG. 1.

(2) Communication quality (End-to-end QoS)

(2-1) Delay, delay time of communication (2-2) Jitter (2-3) Loss rate

The above three are information indispensable for ensuring service qualities. A required QoS level is different depending on the type of applications. They can be measured/calculated by the NSM (14), RSM (111), and TSM (132) using a known technique.

(2-4) Band of access point. This is a value specific to the access point. This is a value derived from (1-1) Type of radio.

(2-5) Usable band. This is dynamic information changed by use states of other terminals at the access point.

(2-6) Number of terminals connected to the access point. This is an index indicating crowdedness of the access point. There can be a case in which measurement of an unused band is difficult, and the number of connected terminals is often used as a parameter. The above two parameters are obtained by the RSM (111).

(2-7) Type of application. This is necessary information since the required QoS level is different depending on the type of application. Application executing means (not shown) in the CPU (21) of the terminal can obtain the application being executed.

(3) Stability (3-1) Number of terminals connected to the access point. This is an index indicating crowdedness of the access point. There can be a case in which measurement of an unused band is difficult, and the number of connected terminals is often used as a parameter. This information can be obtained from each access point as being included in the communication conditions. This is a function of the RSM (111) in FIG. 1.

(3-2) Location of the terminal. By providing a GPS reception portion, not shown, in the communication terminal (40), the location of the terminal can be obtained.

(3-3) Moving speed. By providing an acceleration sensor or the like in the communication terminal (40), a moving speed of the terminal can be obtained. How long the terminal can remain at the access point can be estimated from the cover area. The above two types of information are obtained by the TSM (132).

(3-4) Cover area. By combining a cover area of each wireless access, the above-mentioned location of the terminal, and the moving speed information, time during which the terminal can stay at the wireless access can be estimated. In order to obtain this information, map information of areas capable of communication for each wireless access is provided in the hard disk (23) or the like.

(4) Cost (4-1) Communication fee. A reference of the optimal radio resource is considered to be determined by tradeoff between the guaranteed QoS and a communication fee. Thus, fee information when each radio resource is used is required. Specifically, the communication fee can be calculated by clocking means and a data table of fees.

(5) Power consumption (5-1) Power consumption of the terminal when being connected to each wireless access. This is information used for estimating time during which the terminal can be used from a battery capacity and power consumption of the terminal. The power consumption data may be stored in advance or means for actually measuring power consumption may be provided.

Processing of a connection rule creation portion will be described. In this system, in an environment in which the communication quality is dynamically fluctuated, architecture for maximizing satisfaction according to preference of individual users is provided. The user satisfaction here is not only application QoS but also includes psychological satisfaction of users. Therefore, how to numerically convert the satisfaction when a user uses a radio resource and how to reflect it in the connection rule are important.

The above-mentioned requirement conditions are diversified from a type such as a communication fee for which a graph with a user satisfaction can be drawn to a type such as RSSI that cannot be directly mapped with the user satisfaction. The information can be roughly classified into four types, that is, communication quality, application QoS, subjective evaluation, and user satisfaction. Here, the communication quality refers to measurable quality information such as RSSI, delay, jitter, loss rate and the like. The application QoS refers to quality information in an application layer such as S/N in a video application or the like. The subjective evaluation value refers to a value evaluated by human for the quality of the application. By having a value filtered by human five senses, an evaluation reference closer to the psychological satisfaction of the user than the application QoS can be obtained. The user satisfaction is an evaluation value indicating subjective satisfaction, reflecting preference of each user. By converting these types of information so that they can be mapped with the user satisfaction, it is considered that all the information can be reflected in the radio resource selection.

In these four types of information, the communication quality and the application QoS are in a close relationship with each other, and a lot of studies have been made on mutual conversion of the both. As for the subjective evaluation value, a required value of the application QoS is generated in order to achieve a target MoS value, and conversion between the both is also possible on the basis of accumulation of subjective evaluation experiments.

By preparing known correlations of them in the connection rule creation portion as conversion conditions in advance, definition can be made on the basis of the required conditions. Then, conversion between the user satisfaction and the subjective evaluation values remains as a problem. Subjective evaluation is made in a measurement environment strictly set up by ITU-R or the like. However, in the case of video streaming, for example, some users are not satisfied, saying "What a poor image quality for such a high rate", while other users are fully satisfied, saying "Much better than expected for mobile" for video reproduction with the same evaluation point.

Figure 8:
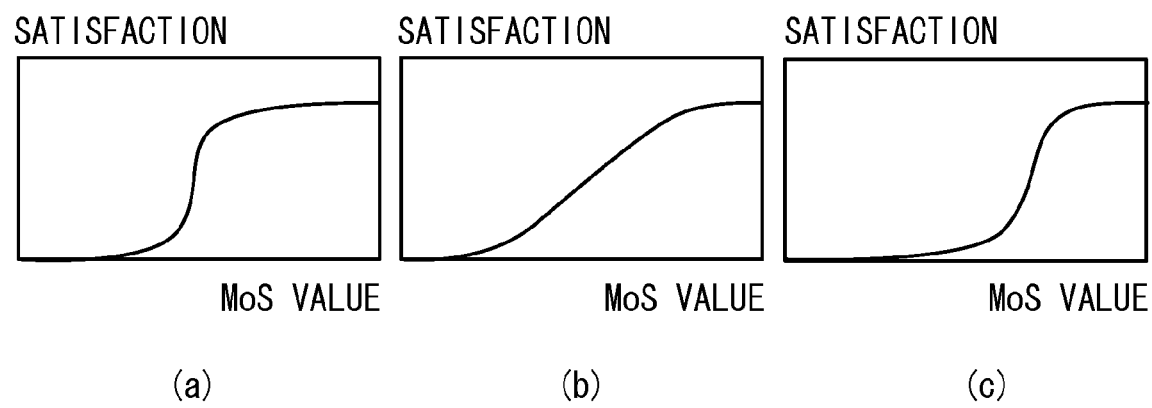
FIG. 8 is a graph illustrating a relationship between a subjective evaluation value (MoS value) and satisfaction.

A graph having a lateral axis for a subjective evaluation value (MoS value) and a vertical axis for satisfaction, for example, is different depending on the user and has various patterns as shown in FIG. 8. Suppose that a relationship between the MoS value and satisfaction of a user is as shown in FIG. 8A. This means that using a MoS value as a threshold value, and a value above it indicates satisfaction, while a value below it indicates dissatisfaction. On the other hand, some users will have a gentler graph as in FIG. 8B and other users will have a higher threshold value as in FIG. 8C.

The connection rule creation portion creates a correspondence relationship between the satisfaction and the MoS value for each user and each application so that it is reflected in radio resource selection in order to maximize the user satisfaction.

Figure 9:
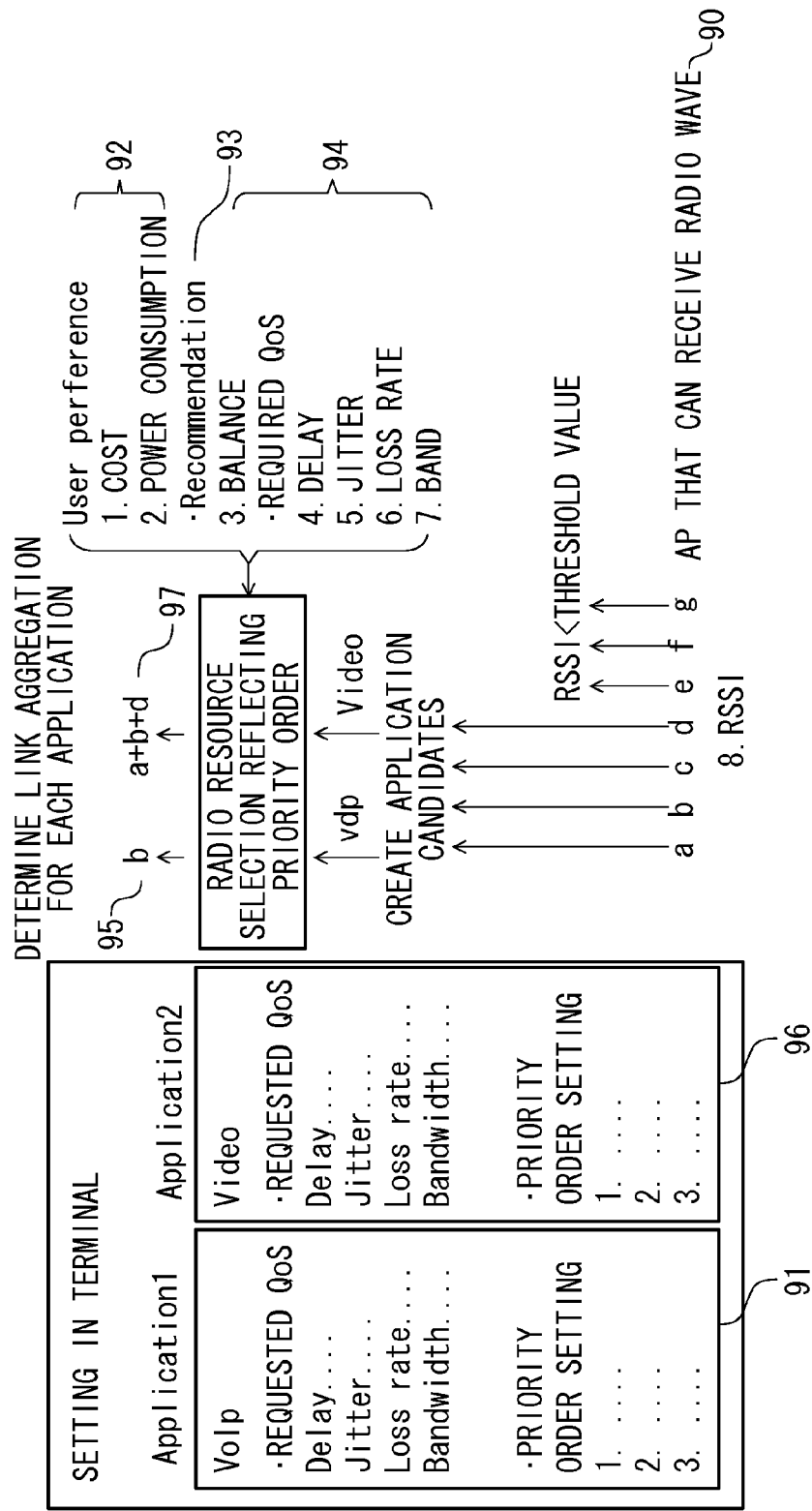
FIG. 9 is a selection algorithm of radio resources along preference of a user.

In this system, on the basis of the communication condition information, in order to select the optimal radio resource, a selection algorithm as shown in FIG. 9 can be used. In addition to a requirement condition (92) and a required QoS (94) set by a user, a balance (93) of the above-mentioned user satisfaction is concentrated in the connection rule creation portion, and a communication network is selected. For example, communication methods satisfying the required QoS are selected as candidates from the usable communication methods and the candidates are narrowed to those matching the cost requirement and the power consumption requirement of the user.

If two or more candidates remain, the balance (93) is considered and if satisfaction is raised by a predetermined value or more in a predetermined cost fluctuation width, the favorable one is selected.

The connection-rule creation portion selects (95) a communication method b in the case of a VoIP application or selects (97) link aggregation by the communication methods a+b+d in the case of a video application (96) by the algorithm as above. The result selected as above is stored in a connection rule table. Information on the communication methods to be stored in the connection rule table may refer to a wireless link such as channel 3 of AP1, for example, or may be a communication method such that "total band within three frequencies is 512 kbps or more". In the case of the former, it is only necessary to select a wireless link as being stored. In the case of the latter, a combination is calculated as appropriate and selected from the collected communication conditions so that the total band matches the stored connection rule table.

As an example, using the algorithm as mentioned above, the connection-method reconstruction management portion (211) determines the connection method. The determined connection method is notified to the connection-method reconstruction control portion (212) in this server (20) and also notified (sq5) to the communication terminal through the Internet or a dedicated signaling channel. (Connection-method reception step (S13)).

Subsequently, the connection-method reconstruction control step (S14) will be described. The connection-method reconstruction control portion (212) of this server reconstructs each access point according to the selected communication method. This reconstruction refers to processing to change a combination of access points for communication or to switch a frequency to be used. In the present invention, since the connection mode can be continuously changed from a state in which the communication has been already made using a known handover technique or the like, it is called reconstruction.

In the example in FIG. 6, the base stations to be reconstructed are AP1 and AP2. To each of the base stations, a frequency and a band width to be used, a modulation method, a MAC method and the like are instructed. The information of the communication terminal can be notified to command that connection with each communication terminal is allowed if necessary. Also, the information required between the base stations as the handover source and the handover destination can be notified in this processing.

The routine is similarly proceeded in the terminal reconstruction control step (S15). In this terminal (40), the connection-method reconstruction control portion (413) instructs a base station to be connected to the communication modules (42) and (43) and also sets the frequency, band width, modulation method, MAC method and the like at that time. By means of the action of the two connection-method reconstruction control portions (212) and (413), wireless communication is established between the selected base station and the communication terminal. (Wireless communication step (S16)).

In the present invention, at this wireless communication step (S16), a plurality of different wireless links such as a wireless link of a plurality of frequencies can be link-aggregated. As mentioned above, in the present invention, a combination of different wireless communication networks can be selected as a communication method. This is extremely important from the viewpoint to effectively utilize unused frequency resources and the like. On the other hand, with the prior-art link aggregation technique, link-aggregation is difficult between the different wireless communication networks or networks with different subnets on the IP basis, for example.

Figure 10:
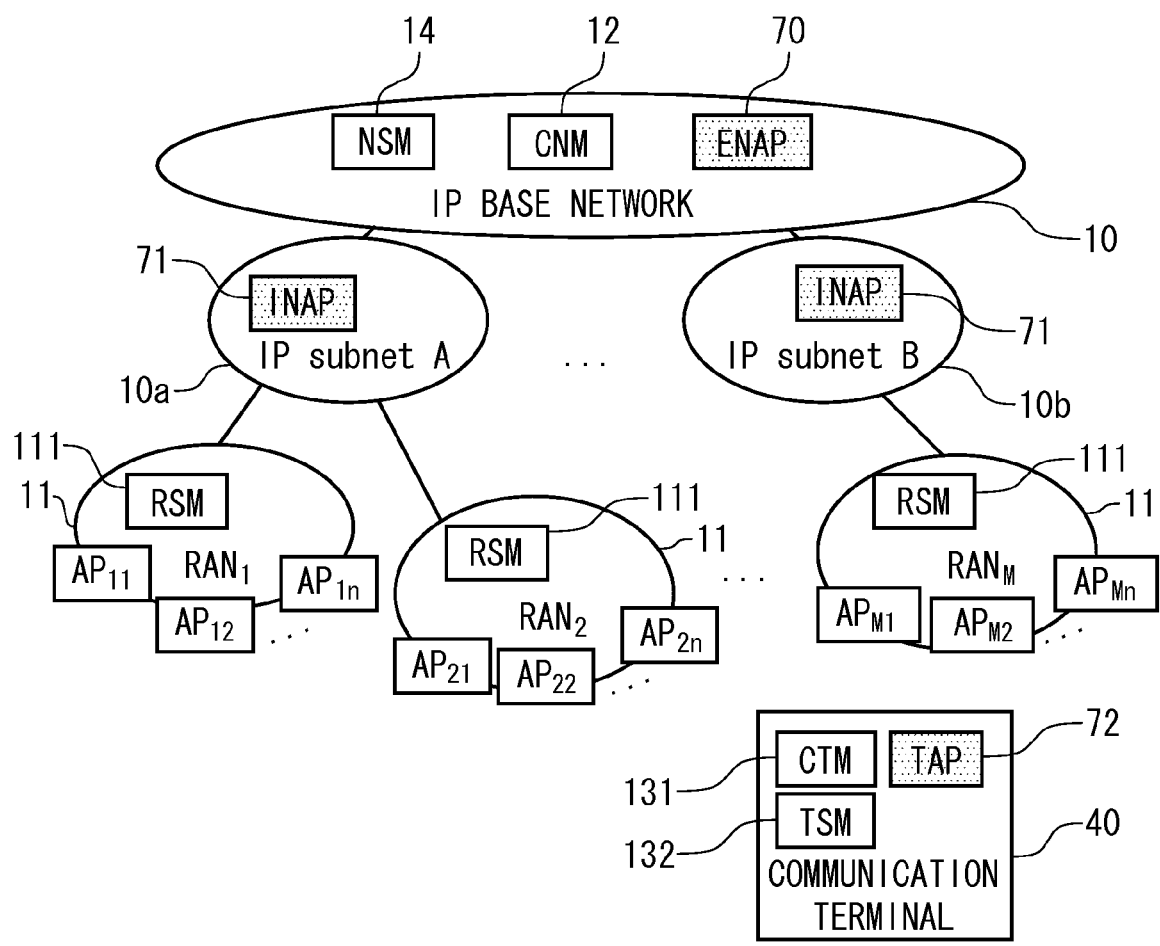
FIG. 10 is an explanatory diagram illustrating a network structure of the cognitive wireless cloud in an IP base network.

Thus, in the present invention, the following configuration is used. FIG. 10 shows an explanatory diagram illustrating a network structure of the cognitive wireless cloud in the IP based network. Two functions of an exterior network aggregation point (ENAP: Exterior Network Aggregation Point) (70) and an interior network aggregation point (INAP: Interior Network Aggregation Point) (71) are newly introduced into the link-aggregate management portion (213) of this server (20) and a function of a terminal aggregation point (TAP: Terminal Aggregation Point) (72) into the link-aggregate management portion (414) of the communication terminal (40).

The ENAP (70) and the INAP (71) have a function to integrate traffic sorted and transmitted from the TAP (72), which is a function of the link-aggregate management portion (41), to a plurality of wireless links and also a function to sort the traffic from the network to the terminal and transfer it to the plurality of wireless links on the network side.

That is, the ENAP (70) has a function of link aggregation in a layer 3 in the IP subnets (10*a*) . . . (10*b*), and the INAP (71) in a layer 2 in the IP subnets (10*a*) . . . (10*b*), respectively.

Figure 11:
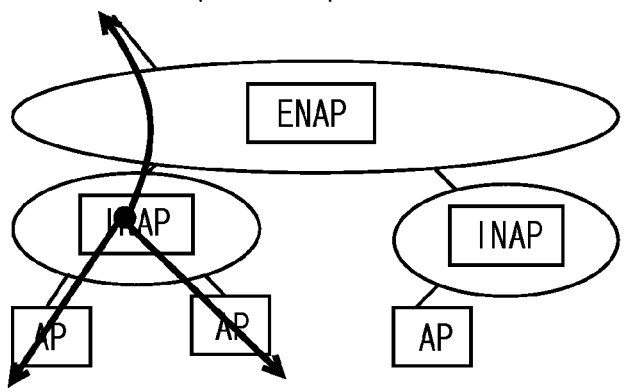
FIG. 11 is three use models performing link aggregation.
Figure 11:
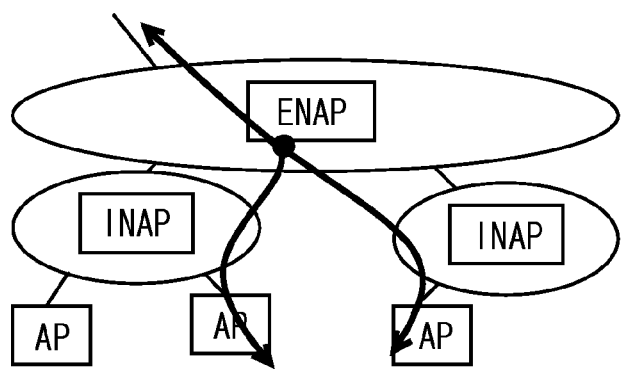
Figure 11:
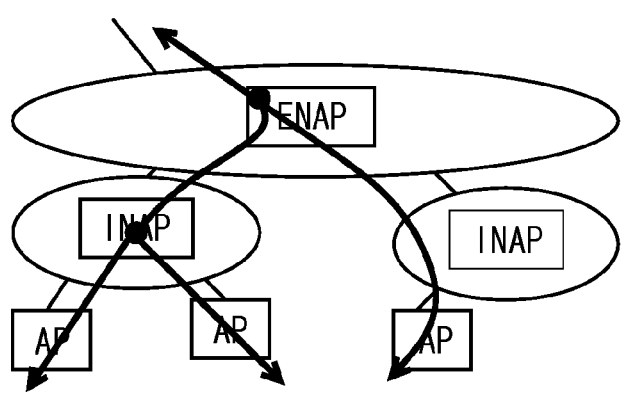

Subsequently, three use models to perform the link aggregation using the INAP (71) and the ENAP (70) are shown in FIG. 11. In FIG. 11A, two wireless links provided by access points in the same IP subnet are integrated by the INAP in the subnet. In this case, the link aggregation is hidden to outside this subnet. Also, in FIG. 11B, two wireless links provided by access points connected to different IP subnets are integrated in the ENAP outside the subnets. Moreover, in FIG. 11C, the above-mentioned two methods are combined, and three wireless links are integrated hierarchically.

Here, the communication networks are classified according to a zone of the IP subnet, but in the practice of the present invention, the communication networks may be classified according to a network operator, and the classification method can be changed arbitrarily.

Figure 12:
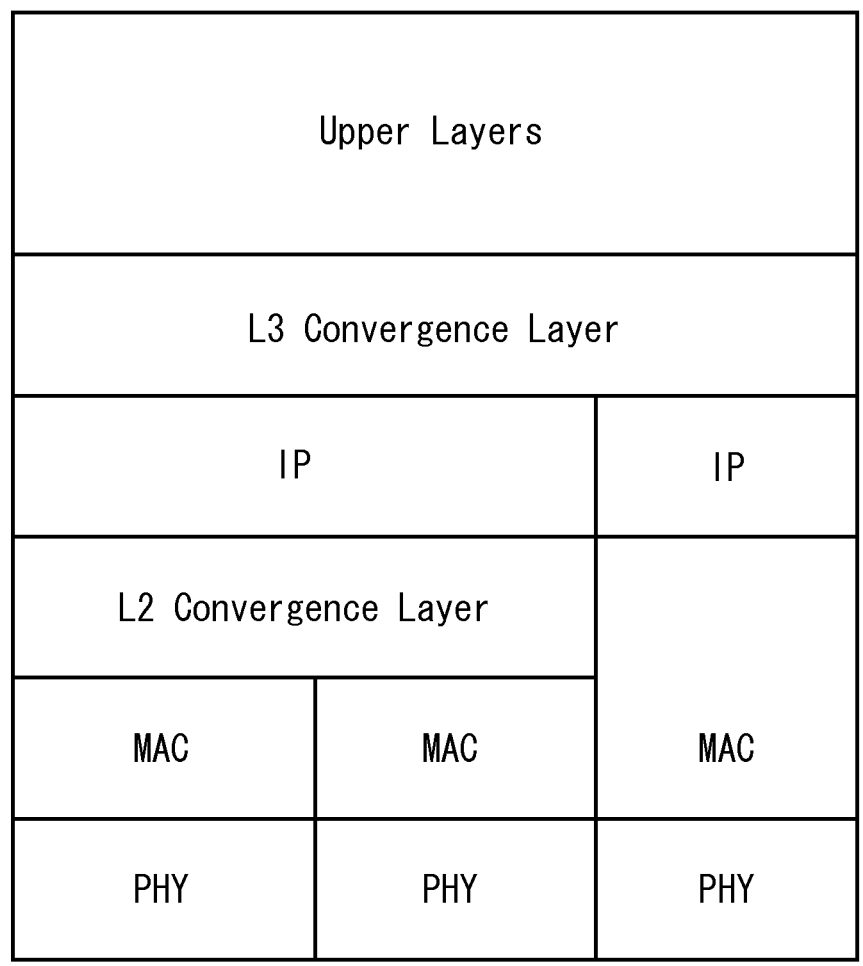
FIG. 12 is an explanatory diagram of a layered structure of a communication terminal.

Lastly, a layer structure of the communication terminal (40) is shown in FIG. 12. Since the communication terminal (30) needs to integrate a plurality of links in each of the layer 2 (L2) and the layer 3 (L3), a convergence layer is introduced into the respective layers.

On the basis of the architecture above, functions of the ENAP (70), INAP (71), TAP (72), CNM (12), and CTM (131) relating to the link aggregation will be defined. First, the ENAP (70) receives an ENAP Reconfiguration Request message from the TAP (72) and sets link aggregation using a wireless link in which a communication interface of the communication terminal (40) having a specified IP address is established as a target. Also, a requested packet is retransmitted in response to the ENAP Retransmission Request message from the TAP (72).

Subsequently, the INAP (71) broadcasts within the same IP subnet and advertises an INAP Advertisement message, which is a unique identification code of the INAP, to the communication terminal (40) connected to an access point of the sub net.

Also, the INAP (71) receives an INAP Reconfiguration Request message from the TAP (72) and sets link aggregation using a wireless link in which a communication interface of the communication terminal (40) having a specified MAC address is established as a target. Moreover, a requested packet is retransmitted in response to the INAP Retransmission Request message from the TAP (72).

The TAP (72) receives an IP address of the ENAP or a MAC address of the INAP corresponding to the combination of the access points for which link aggregation is to be performed and which is determined by the connection-method reconstruction management portion (211) and re-sets an L2 or L3 integrated layer according to that.

To the ENAP or INAP relating to the re-setting, an ENAP Reconfiguration Request or INAP Reconfiguration Request message is transmitted, respectively, in order to request reconfiguration on the network side.

The packets received from a plurality of wireless links are reserved in a reception buffer only for a predetermined time and their order is aligned and at the same time, if any packet is lost, an ENAP/INAP Retransmission Request message is transmitted to the ENAP (70) or the INAP (71) so as to request retransmission.

With the present invention, the link aggregation technique as above is used so as to enable link aggregation communication (sq7).

Moreover, authentication processing (sq6) for wireless link at this server (20) and this terminal (40) may be performed. That is, the authentication management portion (214) of this server (20) and the authentication management portion (415) of this terminal (40) perform known authentication processing on the basis of a command from the respective connection-method reconstruction management portions (211) and (412). Particularly, in the configuration for carrying out the link aggregation, by providing them at this server (20) and this terminal (40), effective authentication processing is realized.

Moreover, the authentication processing portions (313) and (416) may be provided at the access point (30) and this terminal (40).

The present invention can be configured by the above embodiments, but use of a single server device as the wireless communication reconstruction management server (20) is not indispensable as described at the first. Also, the connection method can be designed as appropriate in the scope of the claims.

With the present invention, by collecting the frequencies which have not been in use and virtually integrating them as a single frequency band, they can be offered for communication applications that can be in practical use. That also contributes to improvement of use efficiency of the frequencies currently running short.

Also, since integration can be realized in all the layers from the physical layer to the application layer, the existing devices and software can be used as they are while they are redesigned according to the necessity of a designer, the method of the present invention can be put into practice.

The methods and system of the present invention has been described above and in the attached drawings; however, modifications will be apparent to those of ordinary skill in the art and the scope of protection for the invention is to be defined by the claims that follow.

We claim:

1. A wireless communication system in which a base station and a communication terminal can conduct wireless communication by detecting a usable wireless link with different frame format and changing the wireless link with different frame format used for connection, comprising:

one or more wireless communication networks using a plurality of frequencies within the same kind of wireless communication system;

a single or a plurality of base stations corresponding to the wireless communication network;

on a single or plurality of communication nodes at the communication network side, a memory that stores communication node modules and data, and a processor coupled to the memory, said communication node modules including a base-station usable link detection module that detects a wireless link with different frame formats and having usable frequencies within the same kind of wireless communication network at a current location of the base station;

a connection-method reconstruction management module that determines a link aggregation method of the wireless communication, in which a plurality of wireless links with different frame formats are integrated so as to establish a single traffic, on the basis of communication condition information including information on the usable frequencies within the same kind of wireless communication network at the current locations of the base station and the communication terminal; and a connection-method reconstruction control module that controls the link aggregation method of the wireless communication for the corresponding base stations according to the link aggregation method determined by the connection-method reconstruction management module;

and a communication terminal having a memory that stores communication terminal modules and data, and a processor coupled to the memory, said communication terminal modules including a terminal usable link detecting module that detects the wireless link with different frame formats and having usable frequencies within the same kind of wireless communication network at a current location of the communication terminal;

a terminal reconstruction management module that notifies communication condition information on the terminal side including the information on the detected usable frequencies within the same kind of wireless communication network to the connection-method reconstruction management module and for receiving the link aggregation method determined by the connection-method reconstruction management module; and a terminal reconstruction control module for controlling the link aggregation method of the wireless communication at the communication terminal according to the link aggregation method received by the terminal reconstruction management module.

2. The wireless communication system according to claim 1, wherein said communication node modules further comprising a link aggregate management module for integrating and distributing said traffic with said communication terminal to the plurality of wireless links with different frame formats according to the link aggregation method determined by said connection-method reconstruction management module so as to link-aggregate them; and said communication terminal modules further comprising a terminal link-aggregate management module for link-aggregating the traffic with the link-aggregate management module.

3. The wireless communication system according to claim 2, wherein in said wireless communication system, said communication node modules further comprising an authentication management module for performing authentication processing so as to conduct communication by each wireless link with different frame format to be link-aggregated upon receipt of an instruction from said link-aggregate management module; and said communication terminal module further comprising a terminal authentication management module for performing the authentication processing so as to conduct the communication by each wireless link with different frame format to be link-aggregated upon receipt of an instruction from said terminal link-aggregate management module.

4. The wireless communication system according to claim 1, wherein in said wireless communication system, said communication condition information includes communication quality information required by said communication terminal.

5. A wireless communication reconstruction management server for wireless communication between a base station and a communication terminal using a plurality of wireless communication networks with a plurality of frequencies within the same kind of wireless communication network, by detecting a wireless link with different frame formats and having usable frequencies and by changing the frequencies within the same type of wireless communication network to be used in the connection, comprising:

a memory that stores connection method modules and data coupled to a processor, said modules comprising connection-method reconstruction management module for determining a link aggregation method of wireless communication, in which a plurality of wireless links with different frame formats are integrated so as to establish a single traffic, on the basis of communication condition information including information on a usable frequency within the same kind of wireless communication network at the respective current locations of the base station and the communication terminal determined at the base station by a base-station usable link detection module that detects a wireless link with different frame format and having usable frequencies within the same kind of wireless communication network at a current location of the base station and determined at the communication terminal by a terminal usable link detecting module that detects a wireless link with different frame format having usable frequencies within the same kind of wireless communication network at a current location of the communication terminal; and a connection-method reconstruction control module for controlling the link aggregation method of the wireless communication for the corresponding base station according to the link aggregation method determined by the connection-method reconstruction management module.

6. The wireless communication reconstruction management server according to claim 5, wherein said connection method modules further comprising a link-aggregate management module for integrating and distributing the traffic with said communication terminal to a plurality of wireless links with different frame formats according to the link aggregation method determined by said connection-method reconstruction management module so as to link aggregate them.

7. The wireless communication reconstruction management server according to claim 6, further comprising an authentication management module for performing authentication processing for communication by each wireless link with different frame format to be link-aggregated upon receipt of an instruction from said link-aggregate management module.

8. The wireless communication reconstruction management server according to claim 5, wherein said communication condition information includes information on communication quality required by said communication terminal.

9. A wireless communication method in which a base station and a communication terminal can conduct wireless communication by detecting a usable frequency of a wireless link with different frame format within the same type of wireless communication system and by changing the frequency to be used for connection, using a plurality of wireless communication networks with a plurality of frequencies within the same kind of wireless communication network, and a single or a plurality of base stations corresponding to the wireless communication network, comprising:
- a step of usable frequency link detection in which a base-station usable link detecting module provided on the communication network side and a terminal usable link detecting module of the communication terminal detect usable frequencies from the plurality of frequencies within the same kind of wireless communication network at the respective current locations;
- a step of communication condition information notification in which a terminal reconstruction management module of the communication terminal notifies the communication condition information on the terminal side including the information on the detected usable frequencies within the same kind of wireless communication network to a connection-method reconstruction management module provided on the communication network side;
- a step of connection-method determination in which the connection-method reconstruction management module determines a link aggregation method of wireless communication, in which a plurality of wireless links with different frame formats are integrated so as to establish a single traffic, on the basis of the communication condition information including the information of usable frequencies within same type of wireless communication system at the current locations of the base station and the communication terminal and transmits it to the communication terminal;
- a step of connection method reception in which the terminal reconstruction management module of the communication terminal receives the link aggregation method determined by the connection-method reconstruction management module;
- a step of connection-method reconstruction control in which a connection-method reconstruction control module provided on the communication network side controls a link aggregation method of the wireless communication for the corresponding base station according to the determined link aggregation method; and
- a step of terminal reconstruction control in which a terminal reconstruction control module of the communication terminal controls the link aggregation method of the wireless communication at the communication terminal according to the determined link aggregation method.

10. The wireless communication method according to claim 9, wherein
- a link-aggregate step is provided in which when the traffic is generated between said base station and said communication terminal, a link-aggregate management module provided on the communication network side integrates and distributes the traffic with said communication terminal according to the determined link aggregation method to a plurality of wireless links with different frame formats for link-aggregation, and a terminal link-aggregate management module of the communication terminal link-aggregates the traffic with the link-aggregate management module.

* * * * *